(12) United States Patent
Zimmer et al.

(10) Patent No.: US 10,837,374 B2
(45) Date of Patent: Nov. 17, 2020

(54) CHARACTERIZING A MIXED FUEL FLOW PERIOD

(71) Applicant: Micro Motion, Inc., Boulder, CO (US)

(72) Inventors: Patrick John Zimmer, Denver, CO (US); Taylor Robert Scott, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 239 days.

(21) Appl. No.: 15/780,944

(22) PCT Filed: Jan. 6, 2016

(86) PCT No.: PCT/US2016/012296
§ 371 (c)(1),
(2) Date: Jun. 1, 2018

(87) PCT Pub. No.: WO2017/119874
PCT Pub. Date: Jul. 13, 2017

(65) Prior Publication Data
US 2018/0274460 A1    Sep. 27, 2018

(51) Int. Cl.
| | | |
|---|---|---|
| F02D 19/08 | (2006.01) | |
| F02D 19/06 | (2006.01) | |
| G01F 1/74 | (2006.01) | |
| F02D 41/00 | (2006.01) | |
| G01F 1/84 | (2006.01) | |
| G01F 1/86 | (2006.01) | |

(52) U.S. Cl.
CPC ........ *F02D 19/081* (2013.01); *F02D 19/0613* (2013.01); *F02D 19/0628* (2013.01); *F02D 19/0634* (2013.01); *F02D 19/087* (2013.01); *F02D 41/0025* (2013.01); *G01F 1/74* (2013.01); *G01F 1/84* (2013.01); *G01F 1/86* (2013.01); *Y02T 10/36* (2013.01)

(58) Field of Classification Search
CPC .............. F02D 19/081; F02D 19/0613; F02D 41/0025; F02D 19/087; F02D 19/0628; F02D 19/0634; G01F 1/84; G01F 1/86; G01F 1/74; Y02T 10/36
See application file for complete search history.

(56) References Cited

FOREIGN PATENT DOCUMENTS

| | | | |
|---|---|---|---|
| DE | 102007056819 A1 | | 5/2009 |
| EP | 2532862 | * | 12/2012 |
| EP | 2532862 A1 | | 12/2012 |
| JP | 2007331484 A | | 12/2007 |
| KR | 20140060596 A | | 5/2014 |
| WO | 2015044334 A1 | | 4/2015 |
| WO | WO2015044334 | * | 4/2015 |

* cited by examiner

*Primary Examiner* — Eric S. McCall
*Assistant Examiner* — Timothy P Graves
(74) *Attorney, Agent, or Firm* — The Ollila Law Group LLC

(57) ABSTRACT

A method of characterizing a mixed fuel flow period is provided. The method includes flowing a mixed fuel, the mixed fuel being comprised of at least a first fuel type and a second fuel type, the mixed fuel flow period being determined where the fuel is switched from the first fuel type to the second fuel type, determining a density of the first fuel type and a density of the second fuel type, and determining a total flow, the total flow being determined from the density of the first fuel type and the density of the second fuel type.

18 Claims, 5 Drawing Sheets

| TIME | FUEL SOURCES | RE-CIRCULATOR | ENGINE |
|---|---|---|---|
| TIME < 0 | TYPE 1 | TYPE 1 | TYPE 1 |
| TIME = START | TYPE 2 | TYPES 1 AND 2 | TYPES 1 AND 2 |
| TIME = FINAL | TYPE 2 | TYPE 2 | TYPE 2 |

CHARACTERIZING A MIXED FUEL FLOW PERIOD

TECHNICAL FIELD

The embodiments described below relate to mixed fuel flows and, more particularly, to characterizing a mixed fuel flow period.

BACKGROUND

The marine industry uses different grades of fuels for engines in ships. Although the engines can burn the different fuel grades using various fuel injection control technology, certain conditions can limit the fuel grades that may be used. For example, regulations may limit the fuel grades that can be used by the engine based on the location of the ship. In one specific example, ECA zone regulations may require marine gas oil (MGO) be used when within a range of a coastline. However, MGO may be more expensive than other fuel grades, such as a heavy fuel oil (HFO) grade.

Accordingly, HFO, and other less expensive grades, may be used when the ship is not subject to the conditions. For example, HFO may be used when the ship is greater than a distance from the coastline. As the ship moves closer to the coastline, fuel control systems may switch from the HFO to the MGO to meet the ECA zone regulation. During the fuel switchover, both the HFO and MGO are flowing through the system as a mixed fuel flow. The time that both the HFO and MGO are flowing through the fuel control system may be referred to as a mixed fuel flow period.

The mixed fuel flow period may not be understood. That is, the concentration, total flow, etc., of the mixed fuel flow may not be understood. As a result, in the example with the HFO and MGO fuel grades, the fuel control system may perform the fuel switchover prematurely. Due to the premature fuel switchover, the more expensive MGO grade fuel may be used even though the ship is not subject to the ECA zone regulations. This unnecessary use of the MGO grade fuel is a cost that may be avoided if the mixed fuel flow period is characterized.

SUMMARY

A method of characterizing a mixed fuel flow period is provided. According to an embodiment, the method comprises flowing a mixed fuel, the mixed fuel being comprised of at least a first fuel type and a second fuel type, and determining a density of the first fuel type and a density of the second fuel type. The method also comprises determining a total flow, the total flow being determined from the density of the first fuel type and the density of the second fuel type.

A fuel control system for characterizing a mixed fuel flow period is provided. According to an embodiment, the fuel control system comprises a first fuel source having a first fuel type, a second fuel source having a second fuel type, and a flow meter fluidly coupled to the first fuel source and the second fuel source. The flow meter is configured to measure a density of the first fuel type and a density of the second fuel type. The fuel control system also comprises a controller communicatively coupled to the flow meter. The controller is configured to determine a total flow, the total flow being determined from the density of the first fuel type and the density of the second fuel type.

Aspects

According to an aspect, a method of characterizing a mixed fuel flow period comprises flowing a mixed fuel, the mixed fuel being comprised of at least a first fuel type and a second fuel type, determining a density of the first fuel type and a density of the second fuel type, and determining a total flow, the total flow being determined from the density of the first fuel type and the density of the second fuel type.

Preferably, the method further comprises determining a mixed fuel flow start time and a mixed fuel flow end time.

Preferably, the method further comprises determining a concentration of the first fuel type and a concentration of the second fuel type during the mixed fuel flow period.

Preferably, the method further comprises adding the total flow during the mixed fuel flow with a total flow of a single fuel flow of at least one of the first fuel type and the second fuel type.

Preferably, the total flow is comprised of a total flow of at least one of the first fuel type, the second fuel type, and the mixed fuel flow.

Preferably, the mixed fuel flow period is determined from at least one of a temperature change, a density change, and a signal associated with the mixed fuel flow.

Preferably, the mixed fuel flow period is comprised of a mixed fuel flow start time and a mixed fuel flow end time.

Preferably, the total flow is comprised of a total mass flow.

According to an aspect, a fuel control system (300) for characterizing a mixed fuel flow period comprises a first fuel source (312) having a first fuel type, a second fuel source (314) having a second fuel type, a flow meter (5) fluidly coupled to the first fuel source (312) and the second fuel source (314), the flow meter (5) being configured to measure a density of the first fuel type and a density of the second fuel type, and a controller (360) communicatively coupled to the flow meter (5), the controller (360) being configured to determine a total flow, the total flow being determined from the density of the first fuel type and the density of the second fuel type.

Preferably, the fuel control system (300) further comprises a first valve (322) fluidly coupled to the first fuel source (312) and a second valve (324) fluidly coupled to the second fuel source (314), the first valve (322) and the second valve (324) being communicatively coupled to the controller (360).

Preferably, the fuel control system (300) further comprises a re-circulator (350) fluidly coupled to the flow meter (5) and an engine (20), the re-circulator (350) being configured to recirculate unconsumed fuel provided by the engine (20) back to the engine (20).

Preferably, the controller (360) is further configured to determine a mixed fuel flow start time and a mixed fuel flow end time.

Preferably, the controller (360) is further configured to determine a concentration of the first fuel type and a concentration of the second fuel type.

Preferably, the controller (360) is further configured to add the total flow with a total flow of a single fuel flow of at least one of the first fuel type and the second fuel type.

Preferably, the total flow is comprised of a total flow of at least one of the first fuel type, the second fuel type, and the mixed fuel flow.

Preferably, the mixed fuel flow period is determined from at least one of a temperature change, a density change, and a signal associated with the mixed fuel flow.

Preferably, the mixed fuel flow period is comprised of a mixed fuel flow start time and a mixed fuel flow end time.

Preferably, the total flow is comprised of a total mass flow.

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of characterizing a mixed fuel flow period. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of characterizing the mixed fuel flow period. As a result, the embodiments described below are not limited to the specific examples described below, but only by the claims and their equivalents.

The mixed fuel flow period may be characterized by determining densities of a first and second fuel type in the mixed fuel flow. Concentrations, such as percentage or volume, of the first and second fuel type may be determined from the densities of the first and second fuel type. Other properties or characteristics of the mixed fuel flow may also be determined, such as the temperature, flow rates, etc. Changes in these properties or signals associated with the mixed fuel flow, such as commands to valves that control a supply of the first and second fuel type, may be used to measure the mixed fuel flow period. For example, changes in the temperature and density of the mixed fuel flow may indicate a start and/or end time of the mixed fuel flow period.

Using the densities of the first and second fuel type, a total flow of the mixed fuel flow may be determined. By knowing the total flow of, for example, the first fuel type through a fuel control system, the fuel control system may perform an optimal fuel switchover. For example, when a ship approaches a region requiring the fuel switchover, the time of the fuel switchover can be determined based on the characteristics of the mixed fuel flow period. That is, the fuel switchover may occur such that the first fuel type is sufficiently consumed by the time the ship enters the region. Accordingly, a more expensive grade of fuel may not be used until required, thereby reducing fuel costs, as the following discusses in more detail.

Fuel Control System

Figure 1:
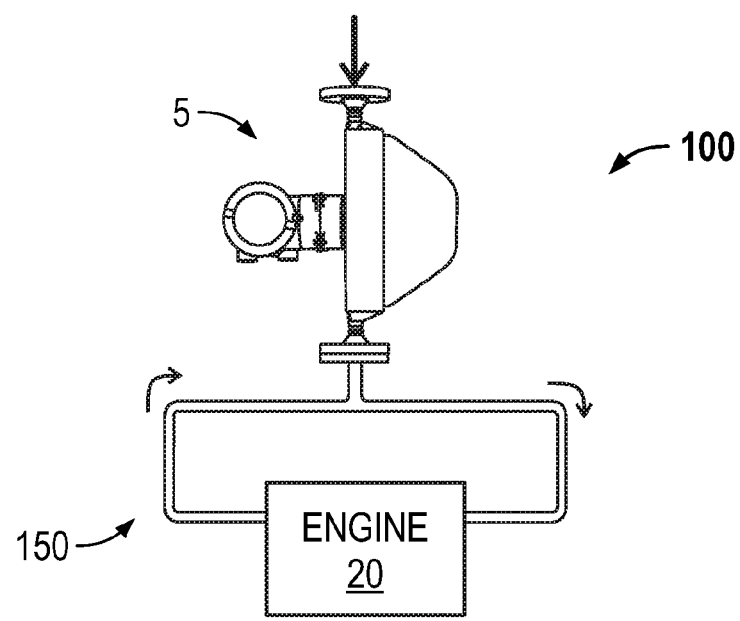
FIG. 1 shows a fuel control system 100 for characterizing a mixed fuel flow period.

FIG. 1 shows a fuel control system 100 for characterizing a mixed fuel flow period. As shown in FIG. 1, the fuel control system 100 is comprised of a flow meter 5 fluidly coupled to an engine 20. Also shown is a re-circulator 150, which is comprised of a fuel line conveying unconsumed fuel provided by the engine 20. The re-circulator 150 re-circulates the unconsumed fuel back to the engine 20 to be consumed. The flow meter 5 is fluidly coupled to the engine 20 via the re-circulator 150.

As shown in FIG. 1, the flow meter 5 may be a vibratory flow meter, such as a Coriolis flow meter, although any suitable flow meter may be employed in alternative embodiments. The flow meter 5 may be configured to measure and/or determine properties and characteristics of the fuel flowing through the flow meter 5. For example, the flow meter 5 may measure a density of the fuel flowing through the flow meter 5. Accordingly, the flow meter 5 may measure the density of the first and second fuel type when the first and second fuel type are flowing through the flow meter 5. The flow meter 5 may also determine the flow rate, such as a mass or volume flow rate, of the fuel. The flow meter 5 may also be configured to measure a temperature of the fuel.

Although the flow meter 5 is shown as a single integrated unit, the flow meter 5 may be comprised of separate components distributed throughout the fuel control system 100. For example, a meter electronics in the flow meter 5 may be part of a separate controller that is communicatively coupled to, for example, the engine 20. Additionally or alternatively, the flow meter 5 may be comprised of separate components that perform specific functions, such as a first component that measures the density of the fuel, a second component that measures the flow rate, etc. The flow meter 5 may also be disposed at different locations in the fuel control system 100. For example, the flow meter 5 may be disposed closer to the engine 20, be part of the re-circulator 150, etc.

As shown in FIG. 1, the flow meter 5 receives fuel from a fuel source (indicated as an arrow in FIG. 1) and provides the fuel to the re-circulator 150. The fuel provided by the flow meter 5 is mixed with the unconsumed fuel provided by the engine 20 into a re-mixed fuel. As can be appreciated, the flow meter 5 provides fuel to the re-circulator 150 at a rate that may be similar to a rate of consumption by the engine 20. As can also be appreciated, FIG. 1 shows a serial configuration. That is, only one flow meter 5 is employed to provide the fuel to the engine 20. In addition, the rate of consumption by the engine 20 is determined from the flow meter 5. Other configurations may be employed, as the following discussion illustrates.

Figure 2:
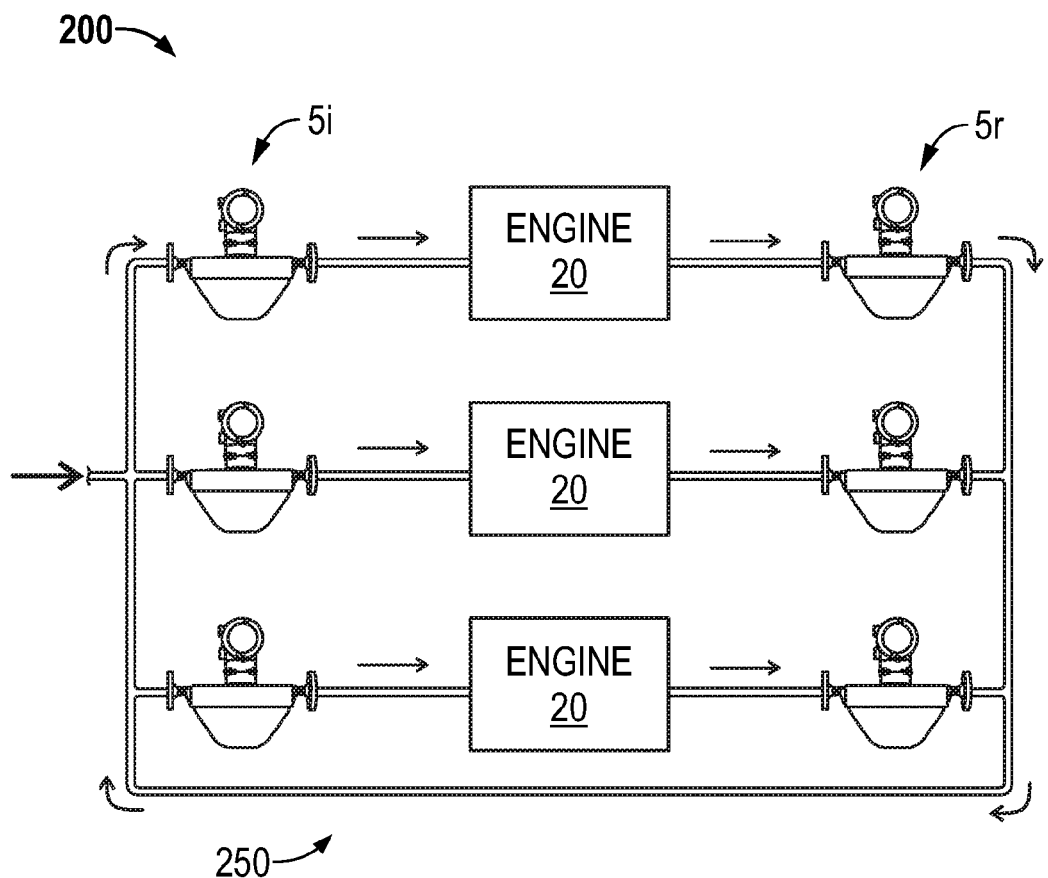
FIG. 2 shows another fuel control system 200 for characterizing a mixed fuel flow period.

FIG. 2 shows another fuel control system 200 for characterizing a mixed fuel flow period. As shown in FIG. 2, the fuel control system 200 is comprised of inlet flow meters 5i fluidly coupled to engines 20. The return flow meters 5r are also fluidly coupled to the engines 20. Also shown is a re-circulator 250, which is comprised of a fuel line re-circulating unconsumed fuel provided by the engine 20. The re-circulator 250 conveys the re-circulated fuel back to the engine 20 to be consumed. The inlet flow meters 5i are fluidly coupled to the engine 20 and the return flow meters 5r are fluidly coupled to inlet flow meters 5i via the re-circulator 250. The inlet and return flow meters 5i, 5r may be the same as the flow meter 5 described with reference to FIG. 1.

The inlet flow meters 5i receive fuel from a fuel source (indicated as an arrow in FIG. 2) and provide the fuel to the engines 20. The fuel provided by the inlet flow meters 5i is mixed with the unconsumed fuel provided by the engines 20 into a re-mixed fuel. As can be appreciated, the inlet flow meters 5i provide the re-mixed fuel to the engines 20 at a rate that may be similar to a rate of consumption by the engines 20. The rate of consumption by the engines 20 may also be similar to the difference in flow rates measured by the inlet flow meters 5i and the return flow meters 5r. As can also be appreciated, FIG. 2 shows a parallel configuration of the inlet flow meters 5i, engines 20, and return flow meters 5r.

The fuel control systems 100, 200 described in the foregoing may have a single fuel flow or a mixed fuel flow. More specifically, the fuel sources indicated by the arrows may be comprised of a single fuel type or a mixture of fuel types. For example, the single fuel type may be one of the HFO and MGO and the mixture of fuel types may include both the HFO and MGO. Accordingly, the mixed fuel flow may include the HFO and MGO. The mixed fuel flow may occur during a mixed fuel flow period, which may be a fuel switchover, which is discussed in more detail in the following.

Figure 3:
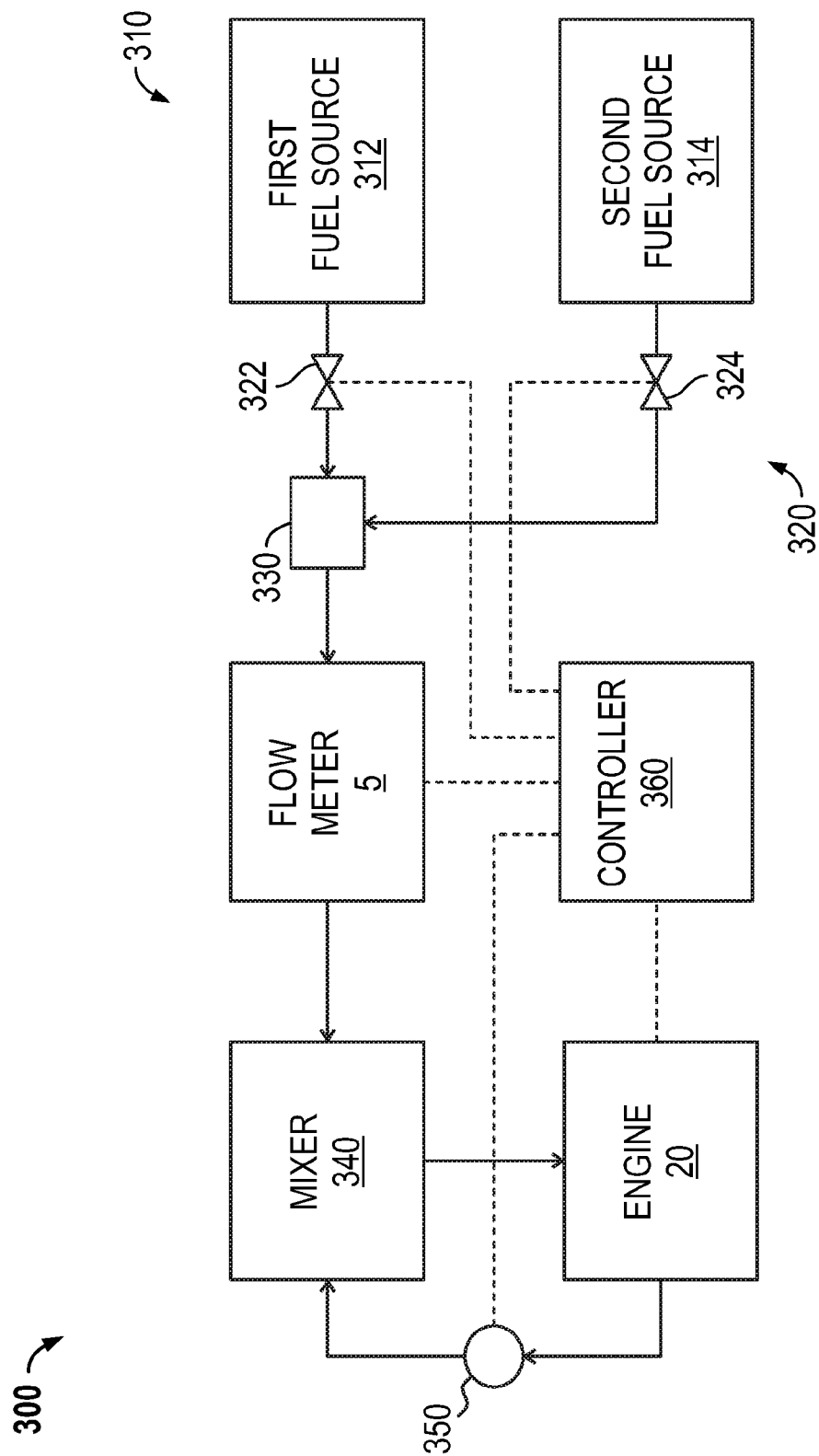
FIG. 3 shows another fuel control system 300 for characterizing a mixed fuel flow period.

FIG. 3 shows another fuel control system 300 for characterizing a mixed fuel flow period. As shown in FIG. 3, the fuel control system 300 is comprised of fuel sources 310 fluidly coupled to valves 320. The valves 320 are fluidly coupled to a first mixer 330, which is configured to receive and mix fuel supplied via the valves 320. The first mixer 330 is fluidly coupled to the flow meter 5 shown in FIG. 3, and is configured to supply fuel from the first and/or second fuel source 312, 314. The flow meter 5 is configured to receive and measure properties of the supplied fuel. The flow meter 5 is fluidly coupled to a second mixer 340. The second mixer 340 is also fluidly coupled to the engine 20 and a re-circulator 350. The second mixer 340 and re-circulator 350 are fluidly coupled to the engine 20. The second mixer 340 is configured to receive and mix the supplied fuel provided by the flow meter 5 and re-circulated fuel from the re-circulator 350 into a re-mixed fuel, and provide the re-mixed fuel to the engine 20. The flow meter 5, engine 20, fuel sources 310, valves 320, and re-circulator 350 are communicatively coupled to a controller 360.

The fuel sources 310 are comprised of a first fuel source 312 and a second fuel source 314. The first fuel source 312 may be a tank (e.g., day tank) with a first fuel type appropriate for a first set of conditions. For example, the first fuel type may be appropriate for use in regions with less restrictive regulations. In one example, the first fuel type may be HFO, although any suitable fuel type may be provided by the first fuel source 312. The second fuel source 314 may also be a tank with a second fuel type that is appropriate for a second set of conditions. For example, the second fuel type may be appropriate for use in regions with more restrictive regulations. In one example, the second fuel type may be MGO, although any suitable fuel type may be provided by the second fuel source 314.

As shown, the valves 320 are comprised of a first valve 322 and a second valve 324, which are respectively fluidly coupled to the first and second fuel source 312, 314. The first and second valve 322, 324 may be fuel switchover valves controlled by the controller 360. The first and second valve 322, 324 may be the same or different size, include sub-controllers, sensors, such as position sensors, or the like. The first and second valve 322, 324 are disposed proximate the first and second fuel source 312, 314 and away from the first mixer 330. However, in alternative embodiments, the first and second valve 322, 324 may be disposed away from the first and second fuel source 312, 314.

By being disposed proximate the first and second fuel source 312, 314, a volume of the supplied fuel between the first and second fuel source 312, 314 and the first and second valve 322, 324 may not be substantial. When, in alternative embodiments, the first and second valve 322, 324 are disposed away from the first and second fuel source 312, 314 and proximate the first mixer 330, the volume of fuel between the first and second valve 322, 324 may be substantial. Similarly, in this alternative embodiment, the volume of the fuel between the valves 320 and the engine 20 may not be substantial.

The first and second mixer 330, 340 may be tanks configured to hold and mix the first and second fuel types into a mixed fuel that is homogenous. That is, the mixed fuel is uniformly comprised of the received first and second fuel type. As can be appreciated, although homogenous, the concentration of the first and second fuel type may vary over time. The first and second mixer 330, 340 may rely on various mechanisms to homogenize the fuel. For example, the first and second mixer 330, 340 may employ, for example, environmental vibrations, agitators, or the like, to homogenize the fuel. However, any suitable configuration may be employed in alternative embodiments.

The re-circulator 350 may be configured to condition fuel re-circulated by the engine 20 for consumption by the engine 20. The re-circulator 350 may be comprised of a pressure controller, temperature controller, or the like, although any suitable configuration may be employed. Conditioning the fuel re-circulated by the engine 20 may include the controller 360 controlling the pressure, temperature, etc., such that the re-circulated fuel is suitable for use by the engine 20. However, in alternative embodiments, the fuel reconditioning may include utilizing components that are not controlled by the controller 360.

The controller 360 may be a circuit board that includes a processor communicatively coupled to a memory and I/O ports, although any suitable controller may be employed in alternative embodiments. The controller 360 may include software that executes methods, such as the methods described herein, to control the flow of fuel through the fuel control system 300 shown in FIG. 3. The software may be stored in the memory and executed by the processor in the controller 360. Although the controller 360 is described as being a single circuit board, in alternative embodiments, other controllers may be comprised of two or more boards, such as sub-boards, modules, or the like.

As shown, the controller 360 may be configured to communicate with the flow meter 5, engine 20, valves 320, and re-circulator 350 using the I/O ports. The I/O ports may be configured to communicate using any appropriate communication means, such as, for example, serial, parallel, packet-based, etc. The controller 360 may receive, for example, flow rate measurements from the flow meter 5, fuel consumption data from the engine 20, valve position information from the valves 320, and fuel re-circulation data from the re-circulator 350 via the I/O ports. The controller 360 may also send commands, such as valve open/close commands, to the valves 320 and fuel conditioning commands to the re-circulator 350.

The processor in the controller 360 may use the received flow rate data to calculate a flow rate of the mixed fuel flowing through the flow meter 5. The processor in the controller 360 may be also configured to determine a mixed fuel consumption rate using flow rate of the mixed fuel provided by the flow meter 5. The processor in the controller 360 may also send commands to open and close the valves 320 over the I/O ports. The commands may be sent simultaneously or at different times. The controller 360 may also include a timer used by the processor to determine the time that the commands are sent to the first and/or second valve 322, 324.

Although not shown in FIG. 3, the fuel control system 300 may be comprised of additional components, such as temperature or pressure sensors, flow control valves, pressure regulators, or the like. Alternatively, other embodiments may not employ all of the components shown in FIG. 3. For example, the other embodiments may not employ the first and second mixer 330, 340, re-circulator 350, etc. Additionally or alternatively, the components shown in FIG. 3 may have other configurations. For example, the first and second mixer 330, 340 may include sensors and/or actuators that are controlled by the controller 360 to mix the fuel received by the first and second mixer 330, 340.

As can be appreciated, in the embodiment shown in FIG. 3, the fuel received by the flow meter 5 may be from the first fuel source 312, second fuel source 314, or both. If the first valve 322 is open and the second valve 324 is closed, then the fuel received by the flow meter 5 may be comprised substantially of the first fuel type. If the first valve 322 is closed and the second valve 324 is open, then the fuel received by the flow meter 5 may be comprised substantially of the second fuel type. If both the first and second valve 322, 324 are open, then the fuel received by the flow meter 5 may be a mixed fuel comprised of the first fuel type and the second fuel type.

The valves 320 may be opened and/or closed at the same or different times. For example, the valves 320 may be in a state where the first valve 322 is open and the second valve 324 is closed. This state may be used when, for example, the engine 20 is being used in a ship in a region with less restrictive regulations that allow the use of the first fuel type. When the ship moves to a region with more restrictive regulations (e.g., ECA zone regulations), the first valve 322 may close and the second valve 324 may open. Accordingly, the opening and closing of the first and second valve 322, 324 may occur substantially simultaneously.

As can be appreciated, the first fuel type in the fuel control system 300 is not immediately consumed by the engine 20 as soon as the first valve 322 is closed. For example, the first fuel type may remain between the fuel sources 310 and the engine 20 for a period of time. In addition, the second fuel type is not immediately provided to the engine 20 when the second valve 324 is opened. The second fuel type may need to flow from the second valve 324 to the engine 20 after the second valve 324 is opened. As a result, both the first and second fuel type may be between the valves 320 and the engine 20. Accordingly, in the embodiment, the first fuel type is mixed with the second fuel type such that a concentration of the first fuel type decreases over time and a concentration of the second fuel type increases over time, as the following discussion with reference to FIG. 4 illustrates.

Mixed Fuel Flow

Figure 4:
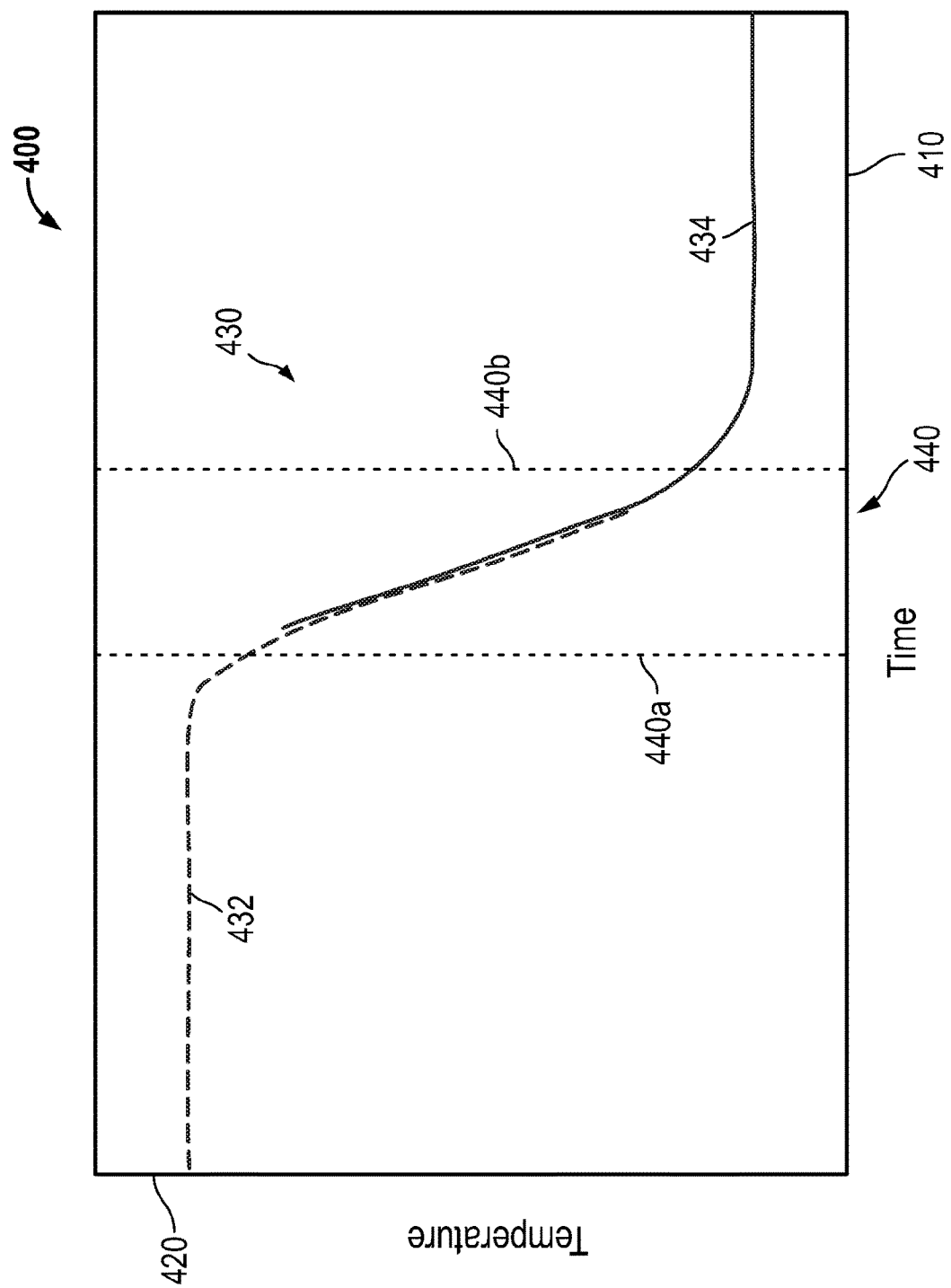
FIG. 4 shows a graph 400 illustrating a temperature of a fuel flow during a mixed fuel flow period.

FIG. 4 shows a graph 400 illustrating a temperature of a fuel flow during a mixed fuel flow period. As shown in FIG. 4, the graph 400 includes a time axis 410 and a temperature axis 420. Fuel temperature plots 430 are also shown. The fuel temperature plots 430 are comprised of a first fuel temperature plot 432 and a second fuel temperature plot 434. The fuel temperature plots 430 traverses a mixed fuel flow period 440. The mixed fuel flow period 440 includes a mixed fuel flow start time 440a and a mixed fuel flow end time 440b.

The mixed fuel flow period 440 may be comprised of a fuel flow switchover time. More specifically, with reference to the fuel control system 300 shown in FIG. 3, the mixed fuel flow period 440 may be comprised of the time between when the first and second valve 322, 324 are respectively closed and opened and when the first fuel type is substantially consumed by the engine 20. As shown, the mixed fuel flow period 440 is non-zero. That is, the first fuel type is not immediately consumed by the engine 20. In addition, the second fuel type is not immediately provided to the engine 20.

As a result, during the mixed fuel flow period 440 shown in FIG. 4, a concentration of the first fuel type may trend downwards with a slope similar to a slope in the first fuel temperature plot 432. Conversely, a concentration of the second fuel type may trend upwards with a slope at a rate similar to the downward slope of the second fuel temperature plot 434. However, other concentrations may be employed in alternative embodiments. For example, in embodiments where the first valve 322 is opened and the second valve 324 is closed, then a concentration of the first fuel type may increase while a concentration of the second fuel type decreases.

The concentrations of the first and second fuel type in the mixed fuel may be determined using the following equations (1) and (2):

$$1 = X + Y \quad (1)$$

$$\rho_{total} = X * \rho_1 + Y * \rho_2 \quad (2)$$

Where:
X is a concentration of a first fuel type in the mixed fuel;
Y is a concentration of a second fuel type in the mixed fuel;
$\rho_1$ is a density of the first fuel type;
$\rho_2$ is a density of the second fuel type; and
$\rho_{total}$ is the density of the mixed fuel.

As can be appreciated, the densities of the first and second fuel type $\rho_1$, $\rho_2$ may need to be known to solve the foregoing equations (1) and (2) for the first and second relative concentration X, Y.

The densities of the first and second fuel type $\rho_1$, $\rho_2$ may be determined in any appropriate manner. For example, the densities of the first and second fuel type $\rho_1$, $\rho_2$ may be stored in, for example, a meter electronics in the flow meter 5, the memory in the controller 360, or the like. In an embodiment, the density of the first fuel type $\rho_1$ may be determined prior to the mixed fuel flow period. That is, the flow meter 5 may measure the density of the first fuel type $\rho_1$ while the first fuel type is flowing prior to the mixed fuel flow period. Accordingly, in this embodiment, the density of the second fuel type $\rho_2$ may be measured after the mixed fuel flow period. As a result, the density of the second fuel type $\rho_2$ may not be known until after the mixed fuel flow period.

The density of the mixed fuel $\rho_{total}$ may be determined by using the flow meter 5 shown in FIG. 4. For example, the density of the mixed fuel $\rho_{total}$ may be measured by the flow meter 5 while the mixed fuel is flowing through the flow meter 5. As can be appreciated, the controller 360 can determine the mixed fuel flow start time 440a and the mixed fuel flow end time 440b by, for example, storing time data associated with the fuel flow start time 440a and the fuel flow end time 440b. Accordingly, the density of the mixed fuel $\rho_{total}$ may be measured and correlated with the mixed fuel flow period 440.

The concentrations of the first and second fuel X, Y, which may be percent concentrations, may be solved (e.g., continuously, discretely, etc.) over a period of time, such as during the mixed fuel flow period 440. For example, the foregoing equations (1) and (2) may be solved continuously using the densities of the first and second fuel type $\rho_1$, $\rho_2$. In the example where the first valve 322 is open and the second valve 324 is closed, the density of the first fuel type $\rho_1$ may be determined when only the first fuel type is flowing through the flow meter 5. Since the second valve 324 may not be opened until the mixed fuel flow start time 440a, the density of the second fuel type $\rho_2$ may not be determined until after the mixed fuel flow end time 440b.

Once the concentrations of the first and second fuel type X, Y are solved over the period of time, the flow of the first and second fuel type may be totalized. For example, the foregoing equation (1) may be integrated over a period of time, such as the mixed fuel flow period 440, to determine a total (e.g., mass) of each fuel type consumed by the engine 20. The totalization may also include fuel flow before and after the mixed fuel flow. The total mass flow of the first and second fuel type may also be determined by, for example, using the following third and fourth equation:

$$M_{FuelType1} = \int X(t) \cdot m_{total} dt \quad (3)$$

$$M_{FuelType2} = \int Y(t) \cdot m_{total} dt \quad (4)$$

Where:
- $m_{total}$ is the total mass of the mixed fuel consumed during the mixed fuel flow period;
- $M_{FuelType1}$ is the total mass of the first fuel type consumed during the mixed fuel flow period;
- $M_{FuelType2}$ is the total mass of the second fuel type consumed during the mixed fuel flow period;
- $X(t)$ is the concentration of the first fuel type over time; and
- $Y(t)$ is the concentration of the second fuel type over time.

As can be appreciated, although the foregoing discusses the mixed fuel flow period 440 being determined where the fuel is switched from the first fuel type to the second fuel type, the mixed fuel flow period 440 can be determined when the fuel is switched from the second fuel type to the first fuel type. Accordingly, in this alternative embodiment, the mixed fuel flow period 440 may be determined from a start time on the right side of the graph 400 and to an end time on the left side of the graph 400. As can also be appreciated, various methods may be employed to determine a time period of the mixed fuel flow period.

Determining the Time Period

The various methods that may be employed to determine the time period of the mixed fuel flow period may include employing density or temperature changes in the fuel flow, the controller 360 using signals associated with the mixed fuel flow, such as the controller 360 determining when the commands are sent to open and close the valves 320, or the like, which are discussed in the following in more detail. However, other methods may be employed in alternative embodiments.

Temperature Changes

The method that employs temperature changes in the fuel flow may determine the mixed fuel flow start time 440a and the mixed fuel flow end time 440b when the temperature of the fuel flow changes. Employing the temperature changes in the fuel flow may be comprised of measuring a temperature of one of the first and second fuel type during a single fuel flow. The term 'single fuel flow' may refer to a state where the fuel in the fuel control system 300 is substantially filled with one of the first and second fuel type and the corresponding one of the first and second valve 322, 324 is open, although any suitable definition may be employed. For example, an alternative definition of single fuel flow may refer to when one of the first and second fuel type is flowing through the flow meter 5. In these and other embodiments, during the single fuel flow, the temperature may remain substantially constant.

When the first and second valve 322, 324 are opened and closed (e.g., simultaneously), then the temperature of the fuel, which may be a mixed fuel flow, flowing through the fuel control system 300 may change. For example, in a manner similar to that shown in FIG. 3, the temperature of the fuel may trend from the temperature of one of the fuel types to the other of the fuel types. The mixed fuel flow start time 440a may be detected when the temperature of the fuel flow exceeds a temperature threshold. For example, when the single fuel flow is comprised of the first fuel type, the controller 360 may track the temperature of the first fuel type and, using statistical methods, establish the temperature threshold using, for example, a confidence interval.

Density Changes

The method that employs density changes in the fuel flow may determine the mixed fuel flow start time 440a and the mixed fuel flow end time 440b when the density of the fuel flow changes. The density of the fuel flow may change because the density of the first fuel type may be different than the density of the second fuel type. Similar to the method that employs the temperature changes, employing the density changes in the fuel flow may be comprised of measuring a density of one of the first and second fuel type during a single fuel flow. During the single fuel flow, the density may remain substantially constant.

When the first and second valve 322, 324 are opened and closed (e.g., simultaneously), then the density of the supplied fuel, which may be a mixed fuel flow, flowing through the fuel control system 300 may change. For example, in a manner similar to that shown in FIG. 4, the density of the fuel may trend from the density of one to the other of the first and second fuel type. The mixed fuel flow start time 440a may be detected when the density of the fuel flow exceeds a density threshold. For example, when the single fuel flow is comprised of the first fuel type, the controller 360 may track the density of the first fuel type and, using statistical methods, establish the density threshold using, for example, a confidence interval.

Signals

As discussed in the foregoing with reference to FIG. 3, the controller 360 may determine when the commands are sent to open and close the valves 320. Accordingly, the method that employs signals associated with the mixed fuel flow, such as the commands to open and close the valves 320, may determine the mixed fuel flow start time 440a and the mixed fuel flow end time 440b. Other signals associated with the mixed fuel flow may be employed, such as, for example, valve position signals provided to the controller 360 to indicate if the first and second valve 322, 324 are open or closed.

In the foregoing methods, the first and second fuel type, as the single fuel flow or mixed fuel flow, may be throughout the fuel control system 300. Whether the single fuel flow or mixed fuel flow is found in a particular location in the fuel control system 300 may depend on the timing of the opening and closing of the first and second valve 322, 324, as the following discussion with reference to FIG. 5 illustrates.

Locations of Fuel Types

Figure 5:
FIG. 5 shows a table 500 characterizing a mixed fuel flow.

FIG. 5 shows a table 500 characterizing a mixed fuel flow. The table 500 includes time rows 510 listing time before the mixed fuel flow start time ("TIME<0"), a mixed fuel flow start time (shown as "TIME=START"), and a mixed fuel flow end time (shown as "TIME=FINAL"). The mixed fuel flow start time and end time may be the mixed fuel flow start time and end time 440*a*, 440*b* described in the foregoing with reference to FIG. 4. The table 500 also includes fuel system location columns 520, which are shown as being fuel sources, re-circulator, and engine. In the table 500 are the first and second fuel type TYPE 1, TYPE 2, which indicate whether the first or second fuel type TYPE 1, TYPE 2 are at the locations indicated in the fuel system location columns 520.

The table 500 shows that before the mixed fuel flow start time TIME<0, fuel in a fuel control system, such as the fuel control system 300 described in the foregoing with reference to FIG. 3, may be a single fuel flow. As shown in FIG. 5, the single fuel flow is comprised of the first fuel type TYPE 1. With reference to the embodiment that employs HFO fuel as the first fuel type, the fuel sources 310 are supplying the HFO fuel. Accordingly, the first valve 322 may be open and the second valve 324 may be closed. In addition, the re-circulator 350 may be filled with the HFO fuel. Similarly, the engine 20 may be consuming the HFO fuel. Accordingly, the entire fuel control system 300 may be filled with the first fuel type from the first fuel source 312.

At TIME=START, which is the mixed fuel flow start time, the fuel sources 310 may be supplying the second fuel type TYPE 2. Accordingly, the first valve 322 may be closed and the second valve 324 may be open. The re-circulator 350 and engine 20 may be filled with both the first and second fuel type. In the embodiment where the second fuel type is MGO fuel, the re-circulator 350 may be filled with the HFO and MGO fuel. Similarly, the engine 20 may be consuming the HFO and MGO fuel. Accordingly, a portion of the fuel control system 300 may be filled with a single fuel flow comprised of the MGO fuel and another portion of the fuel control system 300 may be filled with a mixed fuel flow comprised of the HFO and MGO fuel.

At TIME=FINAL, which is the mixed fuel flow end time, the fuel sources 310 may be supplying the second fuel type TYPE 2. Accordingly, the first valve 322 may be closed and the second valve 324 may be open. The re-circulator 350 and engine 20 may be filled with the second fuel type. In the embodiment where the second fuel type is MGO fuel, the re-circulator 350 may be filled with the MGO fuel. Similarly, the engine 20 may be consuming the MGO fuel. Accordingly, the entire fuel control system 300 may be filled with the second fuel type from the second fuel source 314.

Although the foregoing refers to percent concentrations of the first and second fuel type TYPE 1, TYPE 2, other concentrations may be employed. For example, volume concentrations of the first and second fuel type TYPE 1, TYPE 2 may be determined. The volume concentrations of the first fuel type TYPE 1 may be determined using the following equation (5):

$$C_1 = \frac{V_1}{V_1 + V_2}. \qquad (5)$$

The foregoing equation (5) may be differentiated to determine a rate of change in the concentration of the first fuel type. For example, the rate of change in the concentration of the first fuel type may be determined using the following equation (6):

$$\frac{dc}{dt} = \frac{Q_{in}}{V_1 + V_2} + \frac{c \cdot Q_{out}}{V_1 + V_2}. \qquad (6)$$

The foregoing equation (6) is a differential equation that may be integrated with respect to time to determine the concentration of the first fuel type TYPE 1 as a function of time. As can be appreciated, integrating the foregoing equation (6) can result in the following equation (7):

$$C_1(t) = 1 - e^{\left(-t \cdot \frac{Q_{out}}{V_1 + V_2}\right)}. \qquad (7)$$

Equation (7) may be used as an approximation for empirically refining a characterization of a mixed fuel flow period. For example, equation (7) may be used to refine theoretical solutions for total flow of the mixed fuel flow based upon known values and parameters such as, for example, mixture rates, etc. These and other methods may be employed, as the following discussion with reference to FIG. 6 illustrates.

Method

Figure 6:
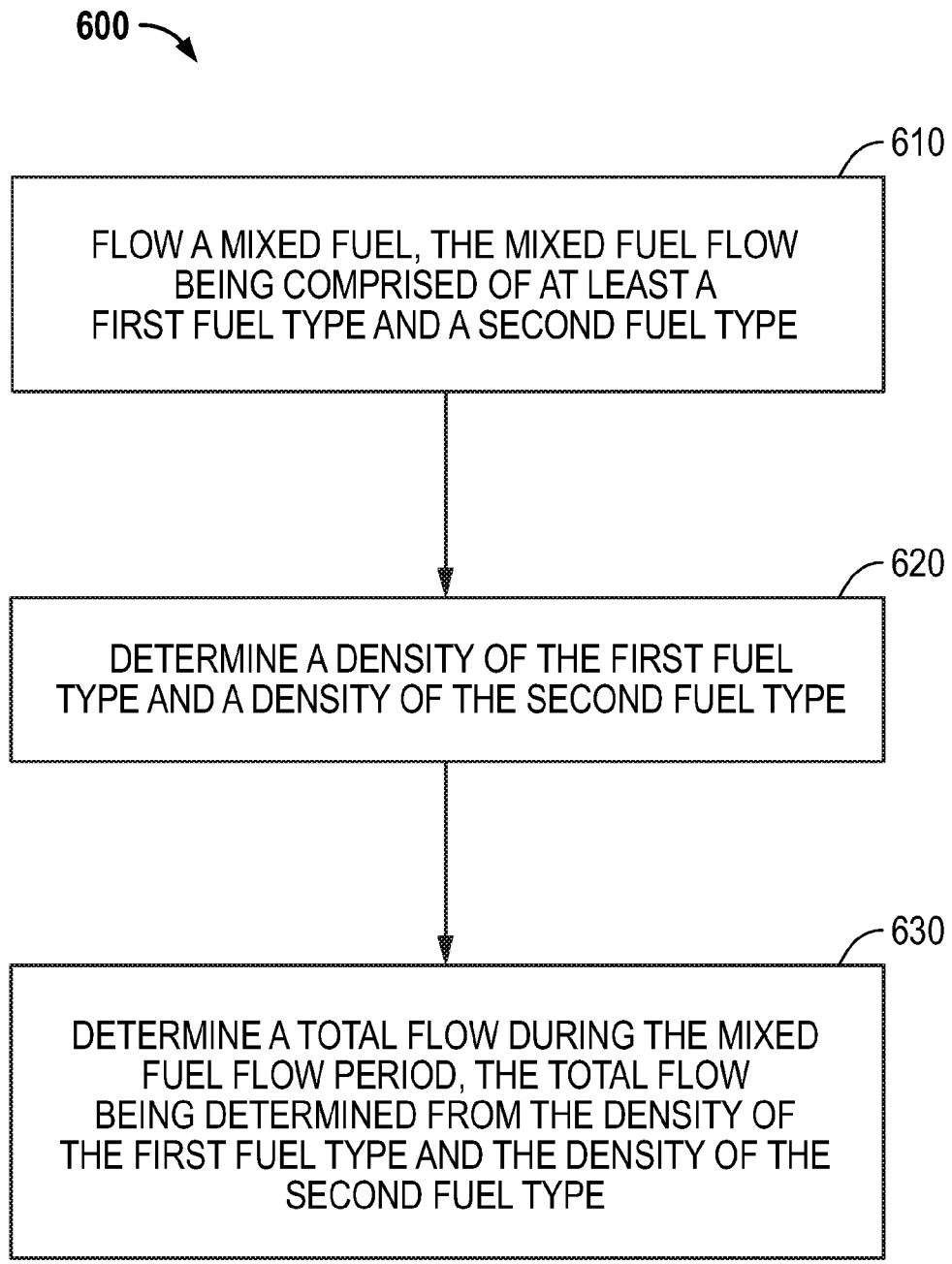
FIG. 6 shows a method 600 of characterizing a mixed fuel flow period.

FIG. 6 shows a method 600 of characterizing a mixed fuel flow period. As shown in FIG. 6, in step 610, the method 600 begins by flowing a mixed fuel. The mixed fuel is comprised of at least a first fuel type and a second fuel type. In step 620, the method 600 determines a density of the first fuel type and the second fuel type. The first and second fuel type may respectively be HFO and MGO fuels provided by the first and second fuel source 312, 314 described in the foregoing. In step 630, the method 600 determines a total flow during the mixed fuel flow period. The total flow is determined from the density of the first fuel type and the density of the second fuel type.

In step 610, the method 600 may cause the first and second fuel source to provide the mixed fuel to the flow meter 5 shown in FIG. 3. The mixed fuel may be provided by opening and closing the valves 320. For example, if the fuel control system 300 has a single fuel flow comprised of the first fuel type, then the first valve 322 may be closed and the second valve 324 may be opened, such that the fuel sources 310 switch from the first fuel type to the second fuel type. However, the first fuel type may still be present in the fuel control system 300 shown in FIG. 3. Accordingly, the fuel flowing through the flow meter 5 may be the mixed fuel flow during the mixed fuel flow period.

The method 600, in step 620, may employ the flow meter 5 to measure the densities of the first and second fuel type. The flow meter 5 may measure the density using any appropriate means. The measured densities may be provided to the controller 360. The controller 360 can use the densities to determine concentrations of the first and second fuel type. For example, the controller 360 can execute methods that employ the foregoing equations (1) and (2). However, the densities can be used to determine any appropriate fluid property or characteristic.

In step 630, the method 600 may determine the total flow during the mixed fuel flow period, such as the mixed fuel flow period 440 described in the foregoing. The mixed fuel flow period may be determined using fluid properties, such as changes in the densities or temperature of the fuel flow, or the like. The mixed fuel flow period may also be determined from signals, such as valve open and close signals, that are sent and/or received by the controller 360. The total flow determined during the mixed fuel flow period may be, for example, the total mass flow determined using the concentrations of the first and second fuel flow using the foregoing equations (3) and (4).

As explained above, the fuel control system 300 and method 600 can characterize the mixed fuel flow period 440. The fuel control system 300 may include the flow meter 5 configured to determine the density of the first fuel type and the second fuel type in the mixed fuel flow. Using the densities of the first and second fuel type, a total flow of the mixed fuel flow may be determined. By knowing the total flow of, for example, the first fuel type through the fuel control system 300, the fuel control system 300 may perform an optimal fuel switchover. For example, when a ship approaches a region requiring the fuel switchover, the time of the fuel switchover can be determined based on the characteristics of the mixed fuel flow. That is, the fuel switchover may occur such that the first fuel type is sufficiently consumed by the time the ship enters the region. Accordingly, a more expensive grade of fuel may not be used until required, thereby reducing fuel costs.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods that characterize a mixed fuel flow period and not just to the embodiments described above and shown in the accompanying figures. Accordingly, the scope of the embodiments described above should be determined from the following claims.

We claim:

1. A method of characterizing a mixed fuel flow period, the method comprising:
   flowing a mixed fuel during the mixed fuel flow period when fuel is switched from a first fuel type to a second fuel type;
   determining a density of the first fuel type and a density of the second fuel type; and
   determining a total flow of the mixed fuel flow period, the total flow being determined from the density and a concentration of the first fuel type and the density and a concentration of the second fuel type.

2. The method of claim 1, further comprising determining a mixed fuel flow start time and a mixed fuel flow end time.

3. The method of claim 1, further comprising determining a concentration of the first fuel type and the concentration of the second fuel type during the mixed fuel flow period.

4. The method of claim 1, further comprising adding the total flow of the mixed fuel flow period with a total flow of a single fuel flow of at least one of the first fuel type and the second fuel type.

5. The method of claim 1, wherein the total flow of the mixed fuel flow period is comprised of a total flow of at least one of the first fuel type, the second fuel type, and the mixed fuel flow.

6. The method of claim 1, wherein the mixed fuel flow period is determined from at least one of a temperature change, a density change, and a signal associated with the mixed fuel flow.

7. The method of claim 1, wherein the mixed fuel flow period is comprised of a mixed fuel flow start time and a mixed fuel flow end time.

8. The method of claim 1, wherein the total flow is comprised of a total mass flow.

9. A fuel control system (300) for characterizing a mixed fuel flow period, the system (300) comprising:
   a first fuel source (312) having a first fuel type;
   a second fuel source (314) having a second fuel type;
   a flow meter (5) fluidly coupled to the first fuel source (312) and the second fuel source (314), the flow meter (5) being configured to measure a mixed fuel flow during a mixed fuel flow period when fuel is switched from the first fuel type and the second fuel type and measure a density of the first fuel type and a density of the second fuel type; and
   a controller (360) communicatively coupled to the flow meter (5), the controller (360) being configured to determine a total flow of the mixed fuel flow period, the total flow being determined from the density and a concentration of the first fuel type and the density and a concentration of the second fuel type.

10. The fuel control system (300) of claim 9, further comprising a first valve (322) fluidly coupled to the first fuel source (312) and a second valve (324) fluidly coupled to the second fuel source (314), the first valve (322) and the second valve (324) being communicatively coupled to the controller (360).

11. The fuel control system (300) of claim 9, further comprising a re-circulator (350) fluidly coupled to the flow meter (5) and an engine (20), the re-circulator (350) being configured to recirculate unconsumed fuel provided by the engine (20) back to the engine (20).

12. The fuel control system (300) of claim 9, wherein the controller (360) is further configured to determine a mixed fuel flow start time and a mixed fuel flow end time.

13. The fuel control system (300) of claim 9, wherein the controller (360) is further configured to determine the concentration of the first fuel type and the concentration of the second fuel type.

14. The fuel control system (300) of claim 9, wherein the controller (360) is further configured to add the total flow of the mixed fuel flow period with a total flow of a single fuel flow of at least one of the first fuel type and the second fuel type.

15. The fuel control system (300) of claim 9, wherein the total flow of the mixed fuel flow period is comprised of a total flow of at least one of the first fuel type, the second fuel type, and the mixed fuel flow.

16. The fuel control system (300) of claim 9, wherein the mixed fuel flow period is determined from at least one of a temperature change, a density change, and a signal associated with the mixed fuel flow.

17. The fuel control system (300) of claim 9, wherein the mixed fuel flow period is comprised of a mixed fuel flow start time and a mixed fuel flow end time.

18. The fuel control system (300) of claim 9, wherein the total flow is comprised of a total mass flow.

* * * * *

UNITED STATES PATENT AND TRADEMARK OFFICE
CERTIFICATE OF CORRECTION

PATENT NO. : 10,837,374 B2
APPLICATION NO. : 15/780944
DATED : November 17, 2020
INVENTOR(S) : Zimmer et al.

It is certified that error appears in the above-identified patent and that said Letters Patent is hereby corrected as shown below:

In the Specification

Column 4, Lines 40, 46, 48, 49, 52, 54 and 57, replace "Si" with --5i--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*